United States Patent [19]

Koot et al.

[11] Patent Number: 4,670,679
[45] Date of Patent: Jun. 2, 1987

[54] ADJUSTING DEVICE WITH OVERLOAD SLIP SYSTEM

[75] Inventors: Hermanus M. I. Koot, Montfoort; Aane A. Oskam, de Meern, both of Netherlands

[73] Assignee: IKU Holding Montfoort B.V., Montfoort, Netherlands

[21] Appl. No.: 722,148

[22] Filed: Apr. 10, 1985

[30] Foreign Application Priority Data

Apr. 11, 1984 [NL] Netherlands .................. 8401149

[51] Int. Cl.$^4$ .................... H02K 7/10; F16H 1/28
[52] U.S. Cl. ...................... 310/99; 74/89.17; 74/412 TA; 74/785; 192/20; 192/56 R; 310/78; 310/80; 310/83
[58] Field of Search ............. 74/89.17, 412 TA, 785, 74/789, 801, 805; 310/12, 80, 83, 76, 78, 92, 97, 100, 99; 188/134, 135; 192/20, 41 R, 56 R

[56] References Cited

U.S. PATENT DOCUMENTS

| | | | |
|---|---|---|---|
| 1,925,943 | 7/1933 | Stein | 74/7 C |
| 2,868,037 | 1/1959 | Hindmarch | 74/785 |
| 3,028,513 | 4/1962 | Sundt | 310/83 |
| 3,295,394 | 1/1967 | Whateley | 74/785 |
| 3,370,220 | 2/1968 | Douglass et al. | 310/83 |
| 3,915,034 | 10/1975 | Ward | 74/740 |
| 4,080,049 | 3/1978 | Oskam et al. | 74/506 |
| 4,528,470 | 7/1985 | Young et al. | 310/78 |

FOREIGN PATENT DOCUMENTS

| | | |
|---|---|---|
| 1959154 | 2/1970 | Fed. Rep. of Germany . |
| 3226435 | 3/1983 | Fed. Rep. of Germany . |
| 2347231 | 4/1977 | France . |
| 2088561 | 6/1982 | United Kingdom . |

Primary Examiner—Patrick R. Salce
Assistant Examiner—D. L. Rebsch
Attorney, Agent, or Firm—Wenderoth, Lind & Ponack

[57] ABSTRACT

An adjusting device with an overload slip system and a slip-independent position indicator includes a driving system and an adjusting member movable by the driving system between two end stops. The driving system includes an electric motor housed in a housing and a planetary transmission connected to the motor shaft, the power output shaft of the transmission being in engagement with the adjusting member. A stationary, internally toothed ring of the planetary transmission is confined between facing peripheral edges of the divided housing and is capable of slipping relatively to the edges of the housing under overload conditions. A support plate with a circular electrical resistor is fixedly connected to the housing on the side of the power output shaft. A runner contact connected to the power output shaft is movable over the resistor. The support plate with the electrical resistor and runner contact form a position indicator operating as a potentiometer, which continues to indicate the exact position of the adjusting member when slip occurs.

5 Claims, 5 Drawing Figures

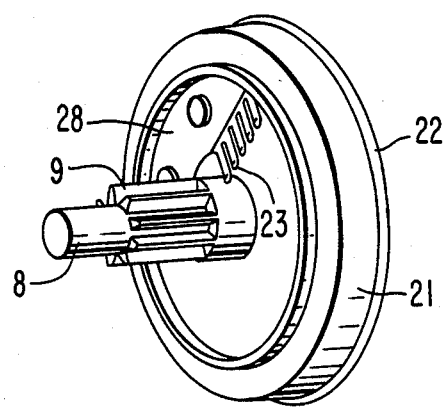
FIG. 2
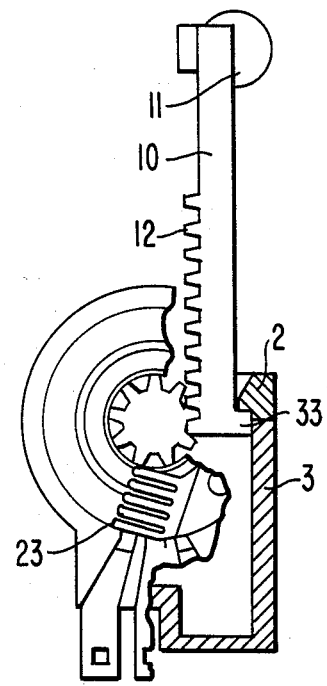
FIG. 3C
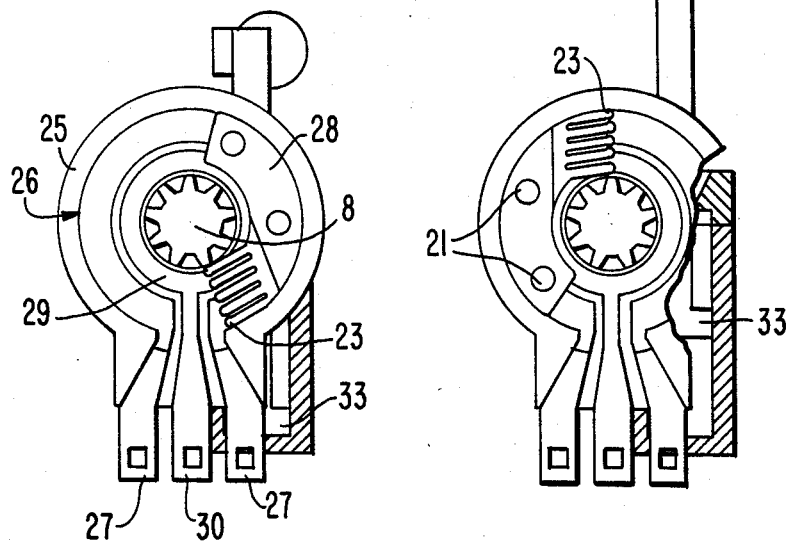
FIG. 3A
FIG. 3B

4,670,679

ADJUSTING DEVICE WITH OVERLOAD SLIP SYSTEM

BACKGROUND OF THE INVENTION

This invention relates to an adjusting device with an overload slip system.

An adjusting device of the type to which the invention relates is disclosed in U.S. Pat. No. 4,101,206. This prior device comprises a housing; an electric drive motor mounted in said housing; a planetary transmission system adapted to be driven by said motor, said transmission system including a sunwheel coupled to the motor shaft, a set of planet gears each having two different sets of teeth, one set of which meshes with an internally toothed stationary ring, and the other with a drivable drum carrying the power output shaft, said power output shaft having a toothed portion meshing with a toothed portion of an adjusting member. The adjusting device forms part of a mirror adjusting instrument. The adjusting member is movable between two extreme positions defined by stops. When the adjusting member is in contact with one of these stops, the driving motor continues to run, so that, at some position between the driving motor and the adjusting member, slip must occur in the driving system. In this prior construction, slip occurs between the adjusting member and the power output shaft of the driving system, caused by the adjusting member being resilient and being laterally deflected by the teeth on the power output shaft of the driving system. The teeth of the power output shaft can thus continue to rotate without displacing the adjusting member which abuts a stop.

This prior construction functions excellently, but presents problems if it is desired to place the adjusting member in a plurality of pre-programmed positions by means of the driving system. This requires a position indicator, which in this prior construction could only be mounted on the adjusting member proper, because there is no fixed relation between the position of the adjusting member and the angular position occupied by the driving system. Mounting a position indicator on the adjusting member is difficult and complicated, especially also because the adjusting member must be resilient.

SUMMARY OF THE INVENTION

It is an object of the present invention to provide an adjusting device suitable for use in programmable systems, and integrating the position indicator in the driving system of the adjusting device.

The invention accordingly provides an adjusting device with an overload slip system, comprising a housing;

an electric driving motor mounted in said housing;

a planetary transmission system adapted to be driven by said motor; said transmission system including a sunwheel coupled to the motor shaft, a set of planet gears each having two different sets of teeth, one of which meshes with an internally toothed stationary ring, and the other with a drivable drum carrying the power output shaft, said power output shaft having a toothed portion meshing with a toothed portion of an adjusting member, characterized in that the stationary ring is provided with friction surfaces which are in contact with corresponding surfaces of the housing, the stationary ring being arranged to slip relatively to the housing under overload conditions, there being provided an electrical position indicator at a location in the drive train intermediate the power output shaft thereof and the stationary ring that slips under overload conditions, said position indicator being arranged to generate an electrical signal that is a measure for the position of the adjusting member relative to the power output shaft.

In this way, the necessary slip facility in the driving system has been shifted ahead in the direction of the motor, and a fixed relation is obtained between the output of the driving system and the adjusting member. This relationship is maintained when slip has occurred in the driving system.

Shifting the slip facility in the direction of the motor provides the possibility of mounting a position indicator on the output portion of the transmission, which position indicator is capable of generating an electrical signal that is a measure for the position of the adjusting member relative to the power output shaft of the driving system. The position information is maintained even after slip has occurred in the driving system.

In order that the friction occurring between the stationary ring and the housing may be influenced, the stationary ring preferably abuts a friction ring mounted in the housing so as to be restrained from rotation and axially slidable, said friction ring being arranged to be pressed into contact with the stationary ring under the influence of an annular leaf spring.

By a suitable choice of the spring constant of the annular leaf spring, the amount of friction which occurs can be adjusted.

BRIEF DESCRIPTION OF THE DRAWINGS

One embodiment of the adjusting device according to the present invention will now be described with reference to the accompanying drawings wherein

FIG. 2 is a perspective view of portions of a position indicator thereof; and

FIG. 3a–3c are end views, partially in section, illustrating three positions of the indicator.

DETAILED DESCRIPTION OF THE INVENTION

Figure 1:
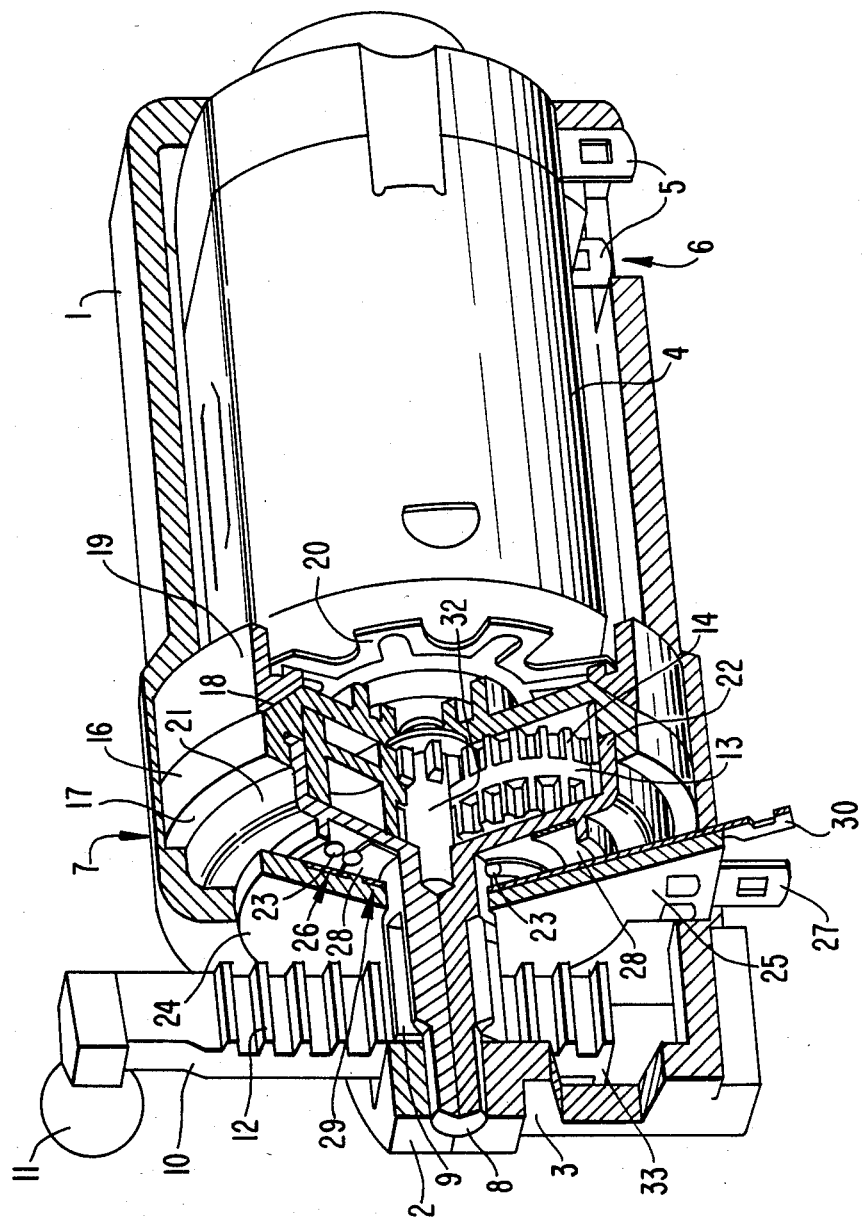
FIG. 1 is a perspective view, partially in section of an adjusting device according to the invention.

Referring to the drawings, there is shown an adjusting device with a driving system, comprising a housing 1, made up of a top portion 2 and a bottom portion 3, with the interface between portions 2,3 extending in a horizontal direction. Mounted in the housing is an electric motor 4, which is rotatable in two directions, and is provided at the bottom with two terminals 5, which are accessible through a hole 6 in the bottom portion 3 of housing 1.

The shaft of motor 4 is coupled with a planetary transmission system 7, the power output shaft 8 of which is provided with teeth 9, meshing with the toothed portion 12 of an adjusting member 10. Provided at one end of adjusting member 10 is a connecting lug 11, by means of which the adjusting member 10 can be connected to a structural part or instrument to be adjusted. The path of movement of adjusting member 10 is limited at the bottom end by the bottom of the bottom section 3 of housing 1. The displacement in the upward direction of adjusting member 10 should also be limited by a stop. This purpose is served by a projection 33 at the back of adjusting member 10, which projection abuts against the top section of housing 1 (operation of projection 33 being shown particularly in FIGS. 3a–3c).

The planetary transmission system 7 comprises a sunwheel 32, one end of which is connected to the shaft of motor 4, and the other end of which is journalled for free rotation in the power output shaft 8. The teeth of sunwheel 32 mesh with three planet gears 13, each provided with two juxtaposed sets of teeth 14,15. Teeth 14 mesh with an internally toothed stationary ring 16 incorporated in housing 1. When sunwheel 32 is driven by the motor, planet gears 13 roll via sets of teeth 14 over the stationary, internally toothed ring 16.

The number of teeth of each set of teeth 15 is slightly different from the number of teeth of set of teeth 14 of the same planet gear 13. Preferably, set 15 has one tooth less than set 14. Sets 15 mesh with an internally toothed drum 21, the rim 22 of which is received in a corresponding recess of stationary ring 16, with drum 21 being arranged to move in the peripheral direction relatively to stationary ring 16. When sunwheel 32 is driven by motor 4, sets of teeth 14 will roll over the stationary teeth of the stationary ring 16 and, owing to the slight difference in the number of teeth between sets 14 and 15, drum 21 will start rotating relatively to stationary ring 16 with a great speed reduction. Using the planetary transmission system 7 as described above, drum 21 can be driven with a speed reduction in the order ranging from 10:1 to infinite:1 relatively to the speed of motor 4, depending on the difference in the number of teeth between sets 14 and 15. The power output shaft 8 of the planetary transmission system 7 is fixedly connected to drum 21.

On the side facing drum 21, stationary ring 16 is provided with a friction surface 17, and on the opposite side it is provided with a bevelled friction surface 18. Friction surface 18 abuts a friction ring 19, incorporated in housing 1 so as to be circumferentially fixed, but movable in the axial direction under the influence of an annular leaf spring 20, the inner rim of which abuts against the front side of motor 4, and the outer rim of which abuts against an internal edge of friction ring 19. By choosing a suitable leaf spring 20, the force with which friction ring 19 is forced into contact with the friction surface 18 of stationary ring 16 can be set.

When the adjusting member 10 freely moves between the stops, the adjusting member is moved at a velocity directly coupled to the peripheral velocity of drum 21, which peripheral velocity is equal to that of the motor divided by the reduction factor of the planetary transmission system 7. When the adjusting member comes to abut one of the stops, slip will occur between the normally stationary ring 16 and the stationary housing, via friction surfaces 17 and 18. Accordingly, when the motor continues to be energized when the adjusting member is arrested, there will be no deformation in the driving train, the adjusting member can remain in engagement with the teeth 9 of the power output shaft of the driving system by virtue of the movability of the normally stationary ring 16 relative to housing 1. Similarly, slip will occur when adjusting member 10 is adjusted manually.

Position indicator 24 comprises a support plate 25, fixedly connected to the housing at a side thereof facing the adjusting member 10. Provided on support plate 25, in a circular path, is a carbon resistor 26, the length of the carbon resistor being approximately equal to the circumference of the pitch circle of carbon resistor 26. The ends of carbon resistor 26 are connected to connecting contacts 27, through which a voltage can be applied to the resistor. The length of the arc of the carbon resistor can in practice be approximately 330°.

Provided on the outside of drum 21, facing support plate 25, is a runner 28 having three resilient sliding contacts 23, two of which run over carbon resistor 26 and one over a circular conductor 29 which is electrically connected to a runner contact 30 provided on support plate 25. Accordingly, position indicator 24 has the form of a potentiometer enabling a voltage to be taken via runner contact 30, which voltage is a measure of the position of the runner 28 and thus of the adjusting member 10.

When this driving system with position indicator 24 is used in a mirror adjusting instrument as described in U.S. Pat. No. 4,101,206, it is found that the mirror can be adjusted with a reproducibility of 15 arc minutes within a temperature range of from −30° to +80° C. with a length of the arc of the carbon resistor of 330°.

By means of the driving system according to the present invention and appurtenant electronics, for example, a mirror adjusting instrument can be made programmable. The voltage associated with a given mirror position is compared to the voltage signal given by runner contact 30, and motor 4 is driven until the adjusting voltage associated with a certain selected position is equal to the voltage given by runner contact 30. At that moment the supply voltage of motor 4 is interrupted, and owing to the low mass inertias in the driving system and the high reduction factor of the planetary transmission system 7, the adjusting member 10 stops within the above reproducibility range of 15 arc minutes for the mirror adjustment.

It will be clear that the maximum path of movement of adjusting member 10 with a given length of the carbon resistor 26 of potentiometer 24 depends on the diameter of the teeth 9 on the power output shaft 8. With a shorter path of movement of member 10 and with the length of carbon resistor 26 remaining the same, the accuracy of adjustment of the system is increased. In fact the accuracy of adjustment is determined by the ratio between the length of the carbon resistor and the path of adjustment, so that a maximum length, i.e. as large a diameter as possible for the pitch circle of the carbon resistor, is desirable.

We claim:

1. In an adjusting device with an overload slip system and including a housing, an electric driving motor mounted in said housing and having an output shaft, a planetary transmission system to be driven by said motor, said transmission system including a sunwheel coupled to said motor output shaft, a set of planet gears each having two different sets of teeth, one of which meshes with an internally toothed normally stationary ring, and the other with a drivable drum carrying a power output shaft, said power output shaft having a toothed portion meshing with a toothed portion of an adjusting member, the improvement comprising:

said normally stationary ring having friction surfaces which are in contact with corresponding surfaces of said housing, such that said stationary ring is arranged to slip relative to said housing under overload conditions; and electrical position indicator means, located in the drive train intermediate said power output shaft and said normally stationary ring that slips under overload conditions, for generating an electrical signal representative of the position of said adjusting member wtih respect to said power output shaft.

2. The improvement claimed in claim 1, wherein said electrical position indicator means comprises a potentiometer having an electrical resistor including a circular carbon layer carried by a support plate fixedly connected to said housing adjacent said power output shaft, and a runner coupled to said power output shaft and movable over said carbon layer.

3. The improvement claimed in claim 2, wherein said circular carbon layer extends over an arc of approximately 330°.

4. The improvement claimed in claim 2, wherein said runner of said potentiometer is arranged on the outside of said drivable drum of said planetary transmission system in opposition to said circular carbon layer on said support plate, and said runner is electrically connected by means of a circular conductor to a runner contact provided on said support plate.

5. The improvement claimed in claim 1, wherein said normally stationary ring abuts against a friction ring which is mounted in said housing and which is fixed in the rotary direction and movable in the axial direction, and annular leaf spring means urging said friction ring into contact with said normally stationary ring.

* * * * *